United States Patent [19]
Thomas et al.

[11] Patent Number: 5,305,643
[45] Date of Patent: Apr. 26, 1994

[54] PRESSURE MICRO-SENSOR

[75] Inventors: Isabelle Thomas; Pierre O. Lefort, both of Valence, France

[73] Assignee: Sextant Avionique, Cedex, France

[21] Appl. No.: 20,081

[22] Filed: Feb. 19, 1993

[30] Foreign Application Priority Data

Feb. 20, 1992 [FR] France .................. 92 02189

[51] Int. Cl.$^5$ .................. G01L 7/08; G01L 11/00
[52] U.S. Cl. .................. 73/704; 73/724; 310/324; 310/338; 361/283.4
[58] Field of Search .................. 73/704, 702, 724, 718, 73/862.41; 361/283; 310/324, 338, 321, 323

[56] References Cited

U.S. PATENT DOCUMENTS 4,841,775 6/1989 Ikeda et al. .................. 73/704
5,146,787 9/1992 Thomas et al. .................. 73/704

FOREIGN PATENT DOCUMENTS 0194953 9/1986 European Pat. Off. .
0467811 1/1992 European Pat. Off. .

Primary Examiner—Donald O. Woodiel
Attorney, Agent, or Firm—Lowe, Price, LeBlanc & Becker

[57] ABSTRACT

A pressure micro-sensor is formed by a sandwich of three silicon plates in contact by their periphery, with an interposed insulating layer in order to define an internal cavity. The lower plate (2) includes a thinner region (21) forming a diaphragm, on its internal side. The intermediate plate (1) includes a peripheral region (11) forming a frame coupled to the upper and lower plates by a silicon oxide layer (24, 25), a first stud (13) mounted onto the thinner region of the lower plate, a second stud (14) mounted onto a thick region of the lower plate, and a silicon beam (15) forming a resonator and disposed between the upper surfaces of the first and second studs in front of the upper plate (3). A first electrode (32) is connected to the upper plate, a second electrode (33) is connected to the frame and a third electrode (31) is connected to the second stud.

7 Claims, 3 Drawing Sheets

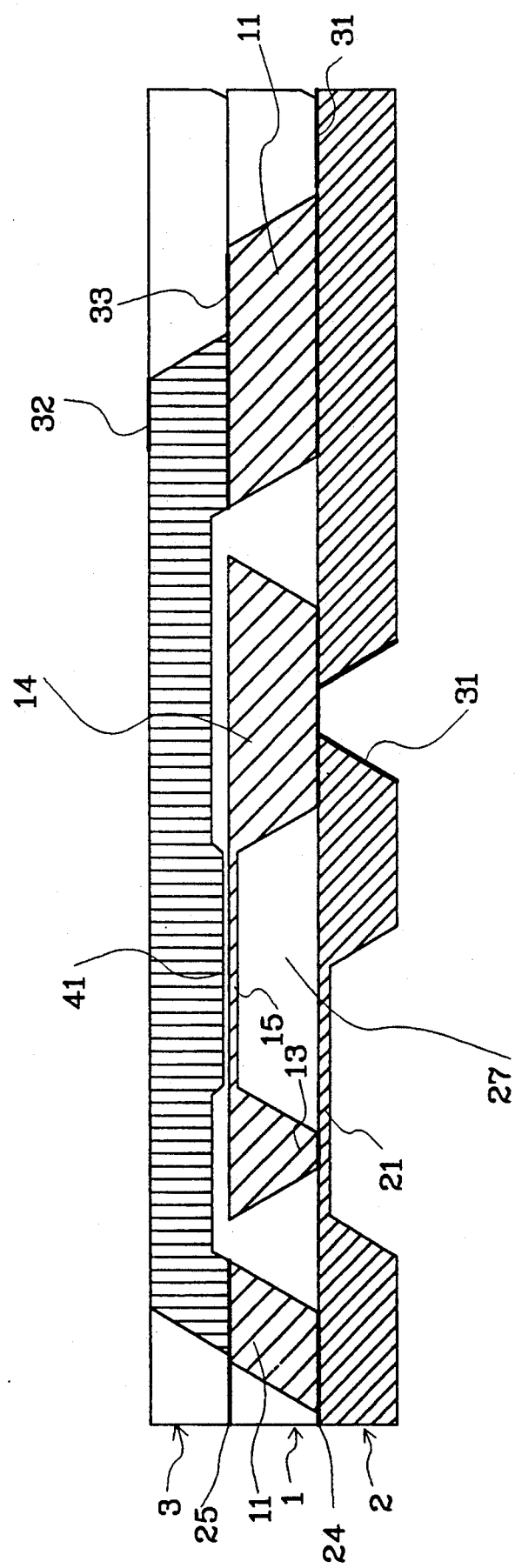

PRESSURE MICRO-SENSOR

BACKGROUND OF THE INVENTION

1. Field of the Invention

The present invention relates to a silicon pressure micro-sensor of the capacitive type.

2. Discussion of the Related Art

Over the last years, new silicon micro-sensors have been developed, taking advantage of the silicon etching techniques developed for the manufacturing of semiconductor electronic components. Initially, such micro-sensors were formed by the combination of suitably etched silicon plates and thin glass plates serving as airtight chamber or as separating insulating plates inserted between the silicon plates, these glass plates bearing various metal electrode patterns.

An exemplary prior art pressure micro-sensor is formed by the device described in French application 90/09,468 filed in the name of the applicant. In this prior art sensor, the active elements are formed by a sandwich of three silicon plates but the whole structure is delineated by two external glass plates which define a controlled atmosphere region.

SUMMARY OF THE INVENTION

An object of the invention is to provide a new pressure micro-sensor, simpler to manufacture, all the active elements of which are formed by three silicon plates also defining an airtight cavity.

Another object of the invention is to provide a pressure micro-sensor with a low stray capacity.

Another object of the invention is to provide a pressure micro-sensor with a high sensitivity.

To achieve these objects and others, the invention provides a pressure micro-sensor formed by a sandwich of three silicon plates in contact by their periphery, with an interposed isolating layer in order to define an internal cavity. The lower plate includes a thinner region forming a diaphragm, on its internal side. The intermediate plate includes a peripheral region forming a frame coupled to the upper and lower plates by a silicon oxide layer, a first stud mounted on the thinner region of the lower plate, a second stud mounted on a thick region of the lower plate, and a silicon vibrating beam disposed between the upper surfaces of the first and second studs in front of the upper plate. The studs are electrically isolated from the frame. A first electrode is connected to the upper plate, a second electrode to the frame and a third electrode to the second stud.

According to an embodiment of the invention, the third electrode is also connected to the lower plate.

According to an embodiment of the invention, the first stud is disposed at a position approximately corresponding to one third of the diaphragm length, and the second stud is distant from this diaphragm.

According to an embodiment of the invention, the second electrode is connected to a reference voltage.

According to an embodiment of the invention, the upper plate includes a thicker region in register with the vibrating beam.

According to an embodiment of the invention, the electrical connection to the second stud is ensured through an aperture in the lower plate and a metallization. This metallization can be formed under a vacuum and obturate the cavity.

The foregoing and other objects, features, aspects and advantages of the invention will become apparent from the following detailed description of the present invention when taken in conjunction with the accompanying drawings.

BRIEF DESCRIPTION OF DRAWINGS

FIG. 4 is a cross-sectional view of another embodiment of a sensor according to the invention.

In the various drawings, the relative thicknesses of the various layers and the lateral sizes of the various elements are not to scale but are arbitrarily drawn in order to facilitate the legibility of the drawings.

Also, in the various figures, the lateral surfaces of the various silicon plates are shown as being obliquely etched since it is the aspect of these lateral surfaces once silicon anisotropic etching along planes (1, 1, 1) has been carried out. However, it will be noted, on the one hand, that this particular aspect of the present invention is not intended as limiting and, on the other hand, that the angle shown on the drawings is arbitrary. An exemplary real angle would be approximately 55°.

DETAILED DESCRIPTION

Figure 1:
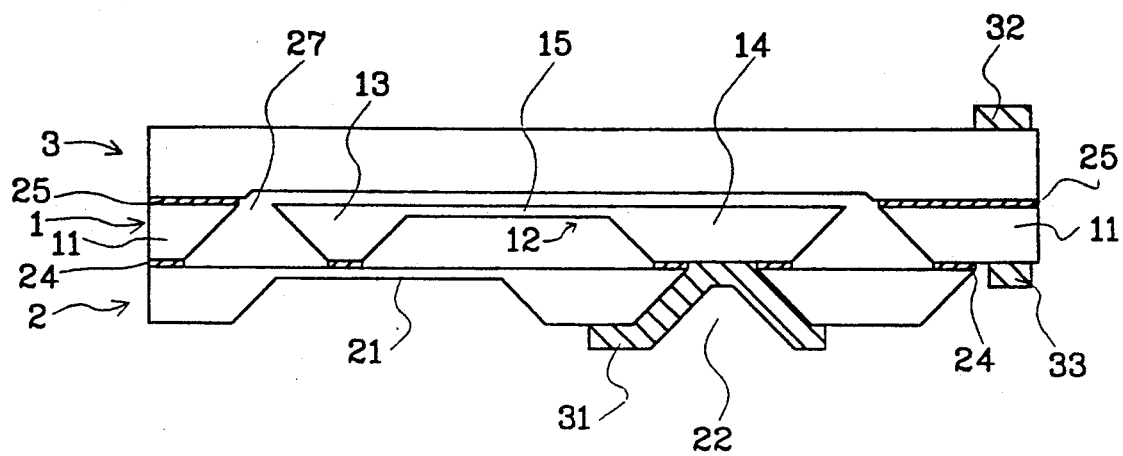
FIG. 1 is a schematic cross-sectional view of a pressure sensor according to the invention.

FIG. 1 is a cross-sectional view schematically showing the overall structure of a sensor according to the invention. This sensor is formed by three silicon plates: an intermediate silicon plate 1, a lower silicon plate 2 and an upper silicon plate 3.

The intermediate silicon plate 1 is divided into two parts: a peripheral portion 11 forming a frame and a central portion 12. The central portion 12 includes a first stud 13, a second stud 14 and a thin beam 15 bridging studs 13 and 14. The central portion is electrically disconnected from the frame portion 11. In the embodiment illustrated, the central portion is electrically and mechanically disconnected from portion 11. A stud 14, mechanically coupled to the frame but separated therefrom by an insulating region such as a silicon oxide region transversely crossing the whole plate, could be provided.

The lower plate 2 includes a thinner region 21 forming a diaphragm. The lower plate 2 contacts the intermediate plate through a silicon oxide layer 24 disposed between the frame of the intermediate plate and the lower plate, and beneath each stud 13 and 14. Stud 13 abuts on the thinner portion forming a diaphragm 21 and stud 14 abuts on the thick region of plate 2. As indicated in the above-mentioned application, stud 13 is preferably disposed at a position corresponding approximately to one third of diaphragm 21. If diaphragm 21 is rectangular, stud 13, at its contact region, preferably has an elongated shape whose longest axis extends along a line separating the diaphragm in one third and two thirds.

The upper plate 3 abuts against frame 11 of the intermediate plate 1 and is separated therefrom by a silicon oxide layer 25.

Thus, the combination of the upper and lower plates defines with frame 11 a cavity 27 having a controlled atmosphere, preferably under a vacuum. When the external pressure varies, diaphragm 21 is deformed, stud 13 tends to tilt and the stress of the vibrating beam 15 varies, which modifies its vibrating beam.

An electrode 31 is electrically connected to the assembly of studs 13 and 14 and beam 15. As shown, electrode 31 can be formed in an aperture passing through plate 2 to contact the lower surface of stud 14. In the embodiment represented, electrode 31 is formed by a metallization which allows to contact stud 14 and plate 2. Also, insulation between the metallization and plate 2 can be provided. An electrode 32 is connected to the upper plate 3 and an electrode 33 is connected to the frame 11 of the intermediate plate. Beam 15 and the upper plate 3 form a capacitive resonator with a resonance frequency varying as a function of the applied pressure.

Figure 2:
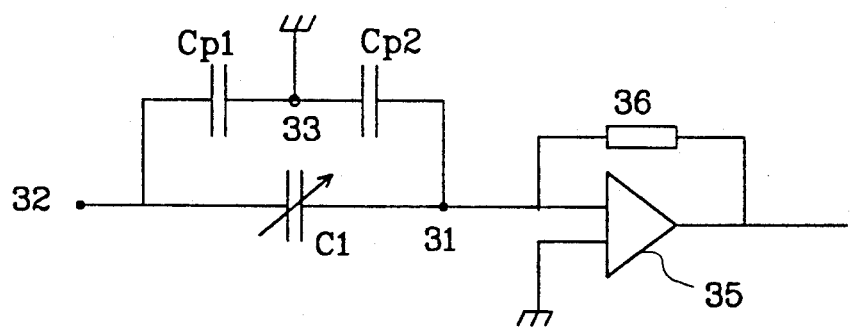
FIG. 2 is an electric diagram schematically showing the various capacities, combined with a detection system, of a sensor according to the invention.

FIG. 2 schematically shows the conventional diagram of a capacitance measuring circuit adapted to the sensor according to the invention. Between electrodes 31 and 32, a varying capacitor C1 corresponds to the capacitor formed by beam 15 and plate 3. This structure is impaired by stray capacities which mainly correspond to the capacitors between each external plate and the frame. The dielectric of capacity Cp1 is oxide layer 25, and the dielectric of capacity Cp2 is oxide layer 24.

Conventionally, the d.c. and a.c. voltage superposition is applied to electrode 32; electrode 31 is connected to the first input of an operational amplifier 35 whose second input is connected to a reference voltage, usually ground. The output of the operational amplifier 35 is connected to its first input through an impedance 36. Thus, the first input 31 of the operational amplifier is at a floating voltage corresponding to the ground voltage. According to an aspect of the invention, electrode 33 is connected to the same reference voltage (ground) as the second input of the operational amplifier 35. Thus, the detrimental effect of the stray capacities Cp1 and Cp2 is eliminated (since capacity Cp2 has its two terminals to the same voltage). This is all the more essential as, because of the device structure, the stray capacities Cp1 and Cp2 normally have values substantially greater than capacitor C1. For example, capacitor C1 has a value of approximately 0.1 pF±10%, whereas capacities Cp1 and Cp2 have values of approximately 50 pF.

Thus, the invention allows to get rid of the influence of the stray capacities. This is all the more advantageous as these stray capacities may have values varying as a function of the ambient atmosphere and manufacturing parameters.

It has been indicated above that the internal portion of the sensor is an area below atmospheric pressure. In order to obtain this vacuum, those skilled in the art can use various methods. For example, the plates can be assembled in a vacuum chamber, or pumping can be achieved once the plates have been assembled. Also, the plates can be filled with a gas such as oxygen which is capable of being absorbed, through annealing, by the silicon.

Figure 3:
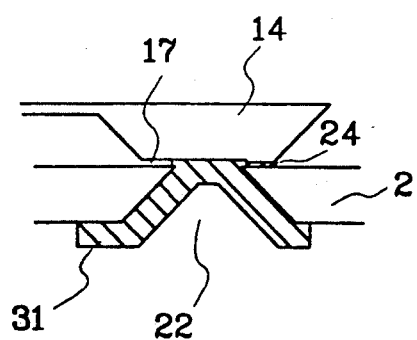
FIG. 3 shows a detail of the manufacturing of an embodiment of the invention.

FIG. 3 is a cross-sectional view of a portion of FIG. 1 illustrating a specific manner for obtaining the sealing under a vacuum of cavity 27. FIG. 3 shows a portion of the lower plate 2 and the second stud 14. The plates are assembled so that plate 2 includes an aperture 22 in register with the base of stud 14. Stud 14 is mounted onto the plate through an insulating layer 24; a channel 17 is provided in the lower surface of the second stud up to the region facing aperture 22. With this system, the plates can be assembled under normal atmosphere. Then, under a selected atmosphere, such as a vacuum, it is possible to deposit the contact material 31 which shorts stud 14 and plate 2, for simultaneously obturating channel 17 and sealing cavity 27.

FIG. 4 is a cross-sectional view of an embodiment of the invention where the same elements as the elements of FIG. 1 are designated with the same reference numerals. FIG. 4 more particularly illustrates a mode to access electrodes 31, 32, 33 through apertures formed in the successive plates. In this implementation, the contact region to stud 14 is formed on plate 2 and is electrically connected to stud 14 through a portion of plate 2 and the above-mentioned metallization 31. FIG. 4 also shows that the upper plate 3 has been etched before being assembled in order to leave a protruding region 41 in front of beam 15 only. This operation allows to reduce the stray capacities between the upper surfaces of studs 13 and 14 and the internal surface of plate 3.

Also, it will be noted in FIGS. 1 and 4 that stud 13 is not disposed at the edge of diaphragm 21 but is clearly recessed with respect to the latter. This arrangement is intended to lengthen the resonating beam 15 to its maximum extent in order to improve the sensor's sensitivity.

Figure 5A:
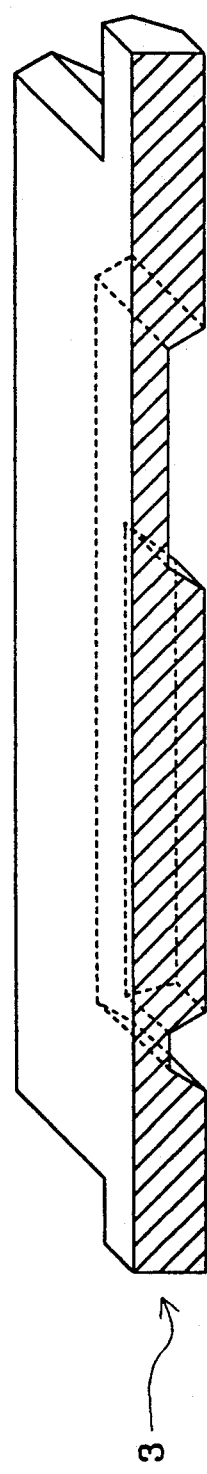
FIGS. 5A, 5B and 5C are cross-sectional and perspective views of three plates, which, once they are assembled, constitute an embodiment of a sensor according to the invention.
Figure 5B:
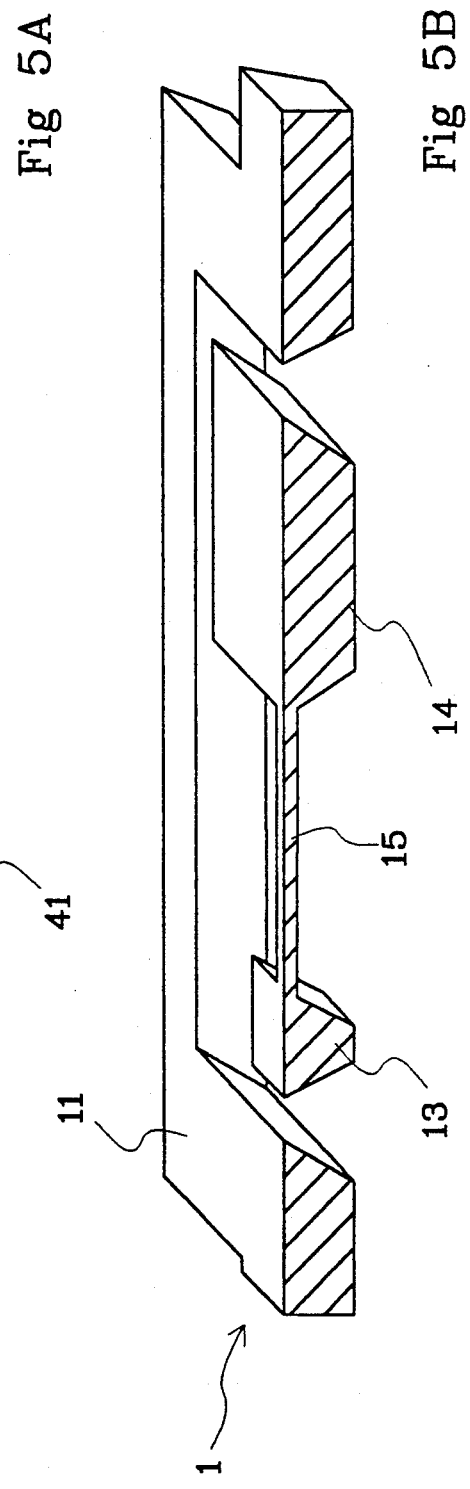
Figure 5C:
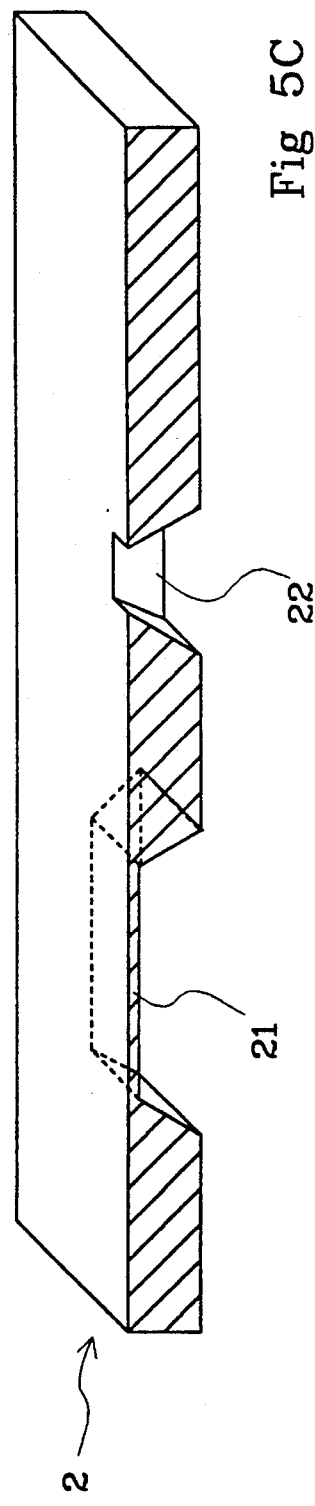

FIGS. 5A, 5B and 5C are perspective views useful for understanding the structure of the pressure sensor according to the invention. In these figures, the three plates are piled up, as shown in perspective; the oxide layers and metallizations are not represented. It will be noted that notches are provided on the right-hand side of the drawing on plates 1 and 2 to allow contact with the metallizations of the lower plates.

In a method of manufacture of a device according to the invention, plates 2 and 3 are initially treated, as above described. However, plate 1 is treated so as to have the general structure above described but, in addition, comprises thin silicon strips in order to mechanically connect the frame 11 to the intermediate portion 13, 14, 15. The intermediate plate is deposited onto the lower plate, a silicon/silicon oxide welding is carried out. Then, silicon is chemically etched in order to eliminate the connecting strips. Of course, the various thicknesses will have been determined beforehand to ensure that the last etching leaves predetermined thicknesses in place for the various active elements.

As is apparent to those skilled in the art, various variants and modifications can be made to the above disclosed preferred embodiments. For example, once the three plates are assembled, the external surface of the external plates can be oxidized and plated with a metal layer forming a shield, and can be grounded to protect the device against parasitic overvoltages.

The manufacturing of a micro-sensor according to the invention has been schematically described and represented. In practice, it will clearly appear to those skilled in the art that this manufacturing results from a collective process, each plate being initially part of a silicon wafer, the separation into individual sensors being made after the end assembling operations and, if required, after the contact operations.

By way of example, a specific device can have the following sizes:
size of the plates: 8×5 mm,
distance between beam 15 and plate 3: 10 μm,
dimensions at the base of stud 13: 0.2×0.6 mm, thickness of diaphragm 21: 15 μm,
lateral size of the diaphragm: 1.6×1.6 mm.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

We claim:

1. A pressure micro-sensor formed by a sandwich of three silicon plates in contact by their periphery, with an interposed insulating layer in order to define an internal cavity, wherein:
   the lower plate (2) includes a thinner region (21) forming a diaphragm, on its internal side,
   the intermediate plate (1) includes a peripheral region (11) forming a frame coupled to the upper and lower plates by a silicon oxide layer (24, 25), a first stud (13) mounted onto the thinner region of said lower plate, a second stud (14) mounted onto a thick region of said lower plate, and a silicon beam (15) forming a resonator, said silicon beam being disposed between the upper surfaces of said first and second studs in front of the upper plate (3), the studs being electrically insulated from the frame,
   a first electrode (32) is connected to said upper plate, a second electrode (33) is connected to the frame and a third electrode (31) is connected to the second stud.

2. The pressure micro-sensor of claim 1, wherein said third electrode is also connected to said lower plate.

3. The pressure micro-sensor of claim 1, wherein said first stud is disposed at a position approximately corresponding to one third of the diaphragm, and said second stud is distant from said diaphragm.

4. The pressure micro-sensor of claim 1, wherein said second electrode is connected to a reference voltage.

5. The pressure micro-sensor of claim 1, wherein said upper plate (3) includes a thicker region (41) in register with the resonator beam (15).

6. The pressure micro-sensor of claim 1, wherein the electrical connection to the second stud is ensured through an aperture in said lower plate and a metallization.

7. The pressure micro-sensor of claim 6, wherein said metallization is formed under a vacuum and obturates said cavity.

* * * * *